Dec. 12, 1944.  F. O. STEBBINS  2,365,018
DRIVING MECHANISM
Filed Oct. 1, 1943

Inventor:
Frederick O. Stebbins,
by Harry E. Dunham
His Attorney.

Patented Dec. 12, 1944

2,365,018

UNITED STATES PATENT OFFICE 2,365,018

DRIVING MECHANISM

Frederick O. Stebbins, Schenectady, N. Y., assignor to General Electric Company, a corporation of New York Application October 1, 1943, Serial No. 504,581

6 Claims. (Cl. 74—315)

My invention relates to drive mechanisms and particularly to an improved differential gearing system.

An object of my invention is to provide an improved drive mechanism having a gearing adapted selectively to provide a direct or a differential drive.

Another object of my invention is to provide an improved electromagnetically controlled driving mechanism for providing either differential or direct drive as desired.

Further objects and advantages of my invention will be better understood from the following description referring to the accompanying drawing, and the features of novelty which characterize my invention will be pointed out with particularity in the claims annexed to and forming part of this specification.

Figure 1:
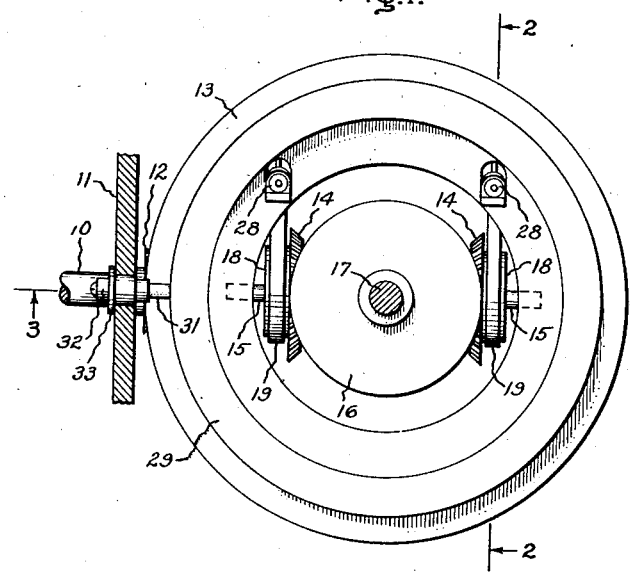
Figure 2:
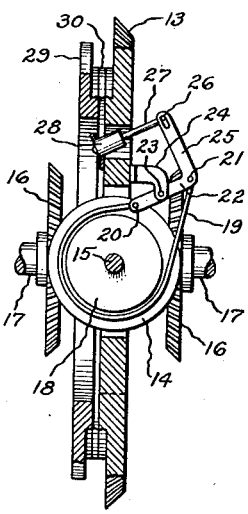
Figure 3:
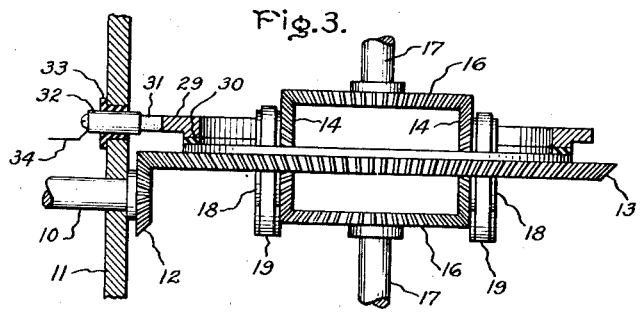

In the drawing, Fig. 1 is an end elevational view of a gear drive provided with an embodiment of my invention; Fig. 2 is a sectional view taken along line 2—2 of Fig. 1; and Fig. 3 is a sectional view taken along line 3—3 of Fig. 1.

Referring to the drawing, I have shown an embodiment of my improved gear drive in which a drive shaft 10 is rotatably supported in a frame 11 and is provided with a bevel drive gear 12 arranged in engagement with a bevel ring gear 13 to provide a driving connection therebetween. The ring gear 13 is arranged as a supporting gear cage for a plurality of bevel planet gears 14 which are supported by shafts 15 rotatably mounted on the ring gear 13. The planet gears 14 are arranged in engagement with a plurality of bevel driven gears 16 mounted on shafts 17 and adapted to be driven by the planet gears 14 and to provide the desired driving connection between the planetary gearing system and the driven shafts 17. The above planetary gearing system includes the conventional essentials of a planetary drive which has the inherent capacity for permitting one of the driven shafts to remain stationary while the other driven shaft 17 is operated. Under certain conditions, this may be found very undesirable, as it may prevent operation of the driven mechanism. In order to prevent this differential action when it is not desired, I provide a braking arrangement which is electromagnetically controlled for exerting a braking force on all of the planet gears for substantially assuring the drive of all of the driven gears by a direct drive through the planet gears 14. This braking arrangement includes a brake drum 18 secured to each of the planet gears 14 about which a friction brake band element 19 is arranged. The ends of the friction brake band element 19 are secured at 20 and 21 to the ends of an arm 22 of a crank which is pivotally mounted at 23 on a bracket 24 secured to the ring gear 13. The crank is provided with a second arm 25 which is pivotally connected at 26 through a lost motion connection to an operating rod 27 secured to an armature of an electromagnetically operated solenoid 28 for actuating the brake mechanism. Electric power is adapted to be supplied to the solenoid 28 by any suitable electrical conductor from a collector ring 29 which is mounted on the ring gear 13 and insulated therefrom by an insulating mounting 30. A contact brush 31 is mounted in a brush holder 32 which is secured in an insulating bushing 33 in the frame 11 and which is adapted to be energized electrically, as may be desired, by being connected to any suitable source of electric power supply through an electrical conductor 34. Thus, for normal differential operation the drive shaft 10 is adapted to transmit power to the driven shafts 17 through the ring gear 13, the planet gears 14, and their associated driven gears 16, and this system is adapted to operate in the conventional manner unless the operator determines that it might be more desirable to provide a direct drive to both of the driven shafts 17 from the drive shaft 10 by locking the planet gears 14 against rotation. Under this latter condition, the solenoids 28 are energized and the arm 25 of the crank is pivoted about its support 23, thereby tightening the brake band 19 about the brake drum 18 on the planet gears 14. This normally prevents rotation of the planet gears 14 and provides the desired direct drive. However, should the stalling force on one of the driven shafts 17 be large, damage to the equipment is prevented by slipping of the brake drums 18 within the brake bands 19. Such operation will indicate to the operator that the overload on the gearing is above a predetermined safe operating value and the load may be removed or lessened on the machine or the driving power may be removed to allow for a correction of the driven load to a safe value.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A drive mechanism including a differential gearing having a ring gear, a plurality of planet gears rotatably mounted on said ring ring, a driving gear arranged to drive said planet gears through said ring gear, a driven gear arranged to be driven by said planet gears, electro-magnetically controlled brake means mounted on said ring gear for exerting a braking force on all of said planet gears for substantially assuring the drive of all of said driven gears and for substantially releasing said planet gears above a predetermined load on said gears, and means including a current collector carried by said ring gear for supplying electrical energy to said electromagnetically controlled brake means.

2. A drive mechanism including a differential gearing having a ring gear and a plurality of planet gears rotatably mounted on said ring gear, a driving gear arranged to drive said ring gear, a plurality of driven gears arranged to be driven by said planet gears, electromagnetically controlled brake means including electromagnetic actuating means on said ring gear and friction brake elements operable on energization of said actuating means for exerting a braking force on all of said planet gears for substantially locking said gears relative to said ring gear, and means including a current collector carried by said ring gear for supplying electrical energy to said electromagnetic actuating means.

3. A drive mechanism including a differential gearing having a planet gear cage, a plurality of planet gears rotatably mounted on said gear cage, a driving gear arranged to drive said planet gears, driven gears arranged in engagement with said planet gears, and electromagnetically controlled brake means on said gear cage, and brake drums secured to said planet gears with friction brake band elements arranged to engage said brake drums on energization of said actuating means for exerting a braking force on all of said planet gears for substantially assuring the drive of all of said driven gears.

4. A drive mechanism including a differential gearing having a ring gear and a plurality of planet gears rotatably mounted on said ring gear, a driving gear arranged to drive said ring gear, a plurality of driven gears arranged to be driven by said planet gears, and electromagnetically controlled brake means including electromagnetic actuating means on said ring gear and brake drums secured to said planet gears with friction brake band elements arranged to engage said brake drums on energization of said actuating means for exerting a braking force on all of said planet gears for substantially assuring the drive of all of said driven gears.

5. A drive mechanism including a differential gearing having a ring gear and a plurality of planet gears rotatably mounted on said ring gear, a driving gear arranged to drive said ring gear, a plurality of driven gears arranged to be driven by said planet gears, and electromagnetically controlled brake means including electromagnetic actuating means on said ring gear, and brake drums secured to said planet gears with friction brake band elements arranged to engage said brake drums on energization of said actuating means for exerting a braing force on all of said planet gears for substantially assuring the drive of all of said driven gears.

6. A drive mechanism including a differential gearing having a planet gear cage, a plurality of planet gears rotatably mounted on a gear cage, driven shafts connected to said planet gears, and electromagnetically controlled brake means on said gear cage and brake drums secured to said planet gears with friction brake band elements arranged to engage said brake drums on energization of said actuating means for exerting a braking force on all of said planet gears for substantially assuring the drive of all of said driven gears and for releasing said planet gears above a predetermined maximum load on said gears.

FREDERICK O. STEBBINS.